United States Patent [19]

Ganse

[11] Patent Number: 5,130,811
[45] Date of Patent: Jul. 14, 1992

[54] COLOR VIDEO SIGNAL RECORDING APPARATUS FOR SUPPRESSING BEST INTERFERENCE

[75] Inventor: Shigeru Ganse, Kanagawa, Japan

[73] Assignee: Sony Corporation, Tokyo, Japan

[21] Appl. No.: 448,280

[22] Filed: Dec. 11, 1989

[30] Foreign Application Priority Data

Dec. 13, 1988 [JP] Japan .................. 63-314564

[51] Int. Cl.$^5$ .................. H04N 5/21; H04N 5/78
[52] U.S. Cl. .................. 358/330; 358/310
[58] Field of Search .............. 358/310, 315, 324, 330, 358/335; 360/27, 28, 30

[56] References Cited

U.S. PATENT DOCUMENTS

| | | |
|---|---|---|
| 3,132,339 | 5/1969 | Boughnou . |
| 3,893,168 | 7/1975 | Bechly et al. .................. 358/330 |
| 4,223,282 | 9/1980 | de Boer .................. 332/10 |
| 4,970,601 | 11/1990 | Achika .................. 358/330 |

*Primary Examiner*—Roy N. Envall, Jr.
*Assistant Examiner*—Huy Nguyen
*Attorney, Agent, or Firm*—Alvin Sinderbrand; William S. Frommer

[57] ABSTRACT

A recording circuit includes a frequency modulator for frequency-modulating an input signal, such as, a luminance signal of a color video signal, a phase inverter for phase-inverting a signal with a predetermined frequency which is included in an output signal of the frequency modulator and which is to be cancelled therefrom, a limiter for amplitude-limiting an output signal of the phase inverter, and an adder in which the output signal of the limiter and another signal, such as, a low-frequency converted carrier chrominance signal of the color video signal which has a carrier frequency equal to the predetermined frequency, are mixed prior to being recorded on a recording medium.

8 Claims, 4 Drawing Sheets

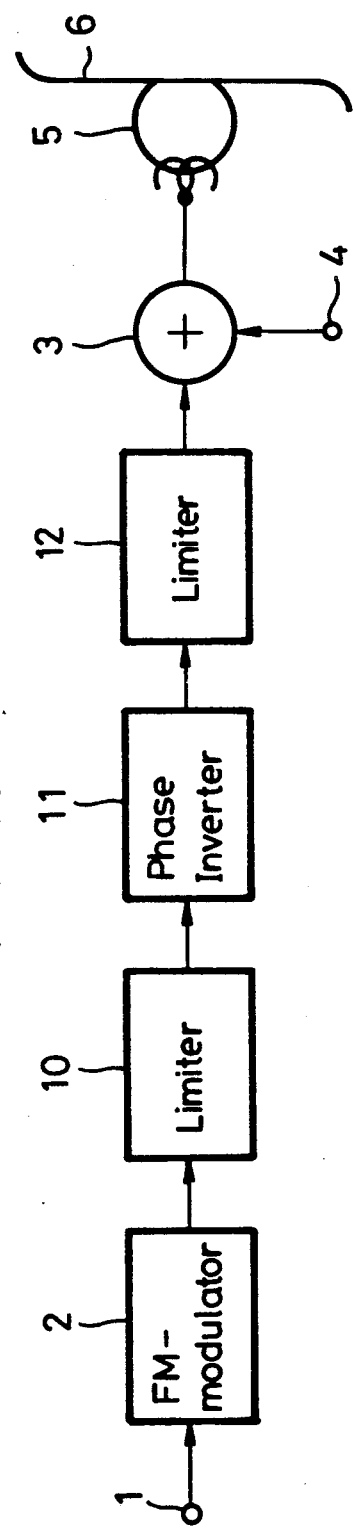
F I G. 4.
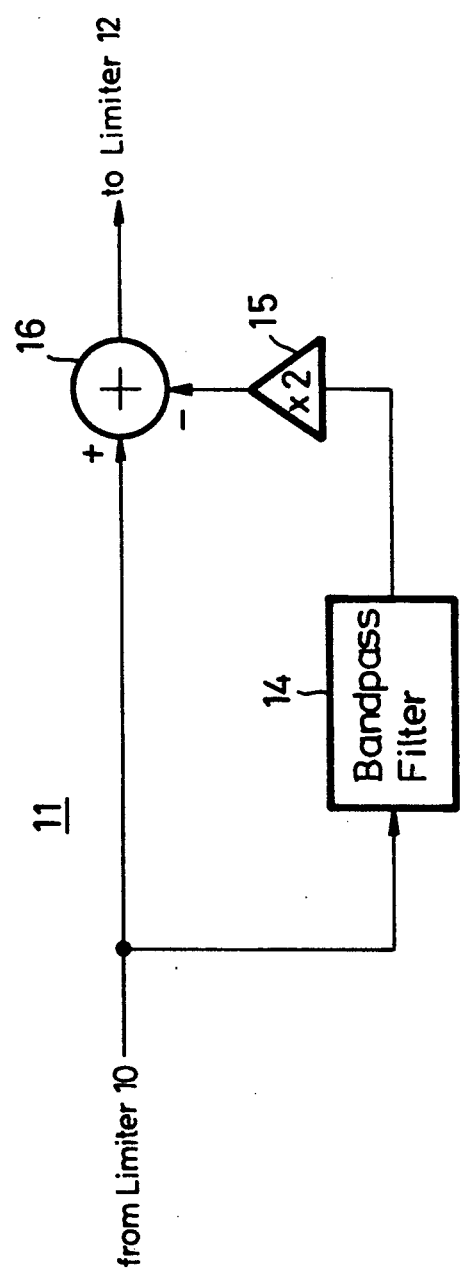
F I G. 5

COLOR VIDEO SIGNAL RECORDING APPARATUS FOR SUPPRESSING BEST INTERFERENCE

BACKGROUND OF THE INVENTION

1. Field of the Invention

The present invention relates generally to a recording circuit suitable for a video tape recorder (VTR), video disc apparatus or the like, and, more particularly, is directed to a recording circuit which can remove an undesired frequency component that causes an undesirable beat interference.

2. Description of the Prior Art

When a color video signal is recorded on a magnetic tape by a video tape recorder (VTR) which, for example, employs a carrier chrominance signal low frequency converting system, the color video signal is separated into a luminance signal and a chrominance signal, the luminance signal is frequency-modulated to provide an FM luminance signal, and the chrominance signal, originally having a carrier frequency of 3.58 MHz in the case of the NTSC system, is low frequency converted to a low frequency converted carrier chrominance signal having a carrier frequency of, for example, 668 kHz. Then, the FM luminance signal and the low frequency converted carrier chrominance signal are mixed or combined and the resulting combined video signal is recorded on the magnetic tape.

When a video signal thus recorded on the magnetic tape is played back or reproduced a combined video signal reproduced from the magnetic tape by a magnetic head is separated into the FM luminance signal and the low frequency converted carrier chrominance signal. The FM luminance signal is demodulated to provide the luminance signal, and the low frequency converted carrier chrominance signal is frequency converted back to the original carrier frequency of 3.58 MHz. Then, the demodulated luminance signal and the reconverted carrier chrominance signal are mixed to provide a reproduced color video signal.

In order to obtain the FM luminance signal having a center frequency $f_r$ from the combined video signal reproduced by the head, it is proposed to remove the low frequency converted carrier chrominance signal having a carrier frequency $f_c$ by means of a trap circuit, or to pass only the FM luminance signal through a high-pass filter. Since the low frequency converted carrier chrominance signal has no frequency deviation, and the frequency band thereof is narrow, the low frequency converted carrier chrominance signal can be readily removed by the trap circuit.

However, a problem arises when using a trap circuit, as described above. More specifically, a cross color may occur when a recorded video signal enters the carrier chrominance signal to give color to an uncolored portion of the picture. In such case, it is difficult to separate the carrier chrominance signal from the recorded color video signal.

In order to avoid the above-mentioned problem, it has been proposed to connect a trap circuit, having a trapping frequency corresponding to that of the low frequency converted carrier chrominance signal, to the output of the frequency modulator for the luminance signal before the resulting FM luminance signal and the low frequency converted carrier chrominance signal are mixed and then recorded on a magnetic tape.

FIG. 1 shows an example of a circuit which embodies the above-mentioned arrangement according to the prior art, and in which a luminance signal is applied to an input terminal 1. The luminance signal applied to the input terminal 1 is FM-modulated by an FM modulator 2 and fed to one input of an adder 3, in which it is added or combined with a low frequency converted carrier chrominance signal supplied to the other input of the adder 3 from a terminal 4. The resulting combined or mixed signal from the adder 3 is recorded on a magnetic tape 6 by a magnetic head 5. Further, in the prior art arrangement of FIG. 1, a trap circuit 7 is interposed between the FM modulator 2 and the respective input of the adder 3. The frequency of the trap circuit 7 is selected to be substantially the same as that of the signal to be mixed with the FM luminance signal, that is, the low frequency converted carrier chrominance signal.

FIG. 2 schematically shows a frequency spectrum of a standard FM signal derived from the FM modulator 2, and from which it is apparent that the odd-numbered side band components of the lower side band (LSB) and the upper side band (USB) are opposite in phase, whereas the even-numbered side band components of the lower and upper side bands are the same in phase as each other and as the carrier. Since the FM luminance signal and low frequency converted carrier chrominance signal are mixed by the adder 3 and then recorded by the circuit shown in FIG. 1, a frequency spectrum as shown in FIG. 3A has to be considered as possible for the output from the FM modulator 2. In other words, an odd-numbered side band component having a frequency equivalent to the frequency $f_c$ of the low frequency converted carrier chrominance signal may occur in the LSB, and may interfere with the low frequency converted carrier chrominance signal when mixed with the latter in the adder 3, thereby causing a beat interference. In an effort to avoid such interference, the prior art provides the trap circuit 7 whose trap frequency corresponds to the frequency $f_c$ of the odd numbered side band components which is the same as the frequency $f_c$ of the low frequency converted carrier chrominance signal with which the FM luminance signal is to be mixed. The odd-numbered side band component of the frequency $f_c$ in the LSB is removed by the trap circuit 7, as shown in FIG. 3B. However, if the recording/reproducing system that follows the adder 3, such as, the magnetic head 5, the magnetic tape 6 and the like, has a limiter characteristic, the USB side of the FM luminance signal is folded in the course of the recording and reproducing operations, whereby the odd-numbered side band component which had been trapped in the LSB is restored therein, as shown in FIG. 3C. The frequency $f_c$ of the restored odd-numbered side band component is close to that of the low frequency converted carrier chrominance signal, so that this odd-numbered side band component and the low frequency converted carrier chrominance signal cause a beat interference to occur which deteriorates the quality of the reproduced picture.

OBJECTS AND SUMMARY OF THE INVENTION

Accordingly, it is an object of the present invention to provide an improved recording circuit which can avoid the above problems encountered with the prior art.

More specifically, it is an object of the present invention to provide a recording circuit which can prevent occurrence of a beat interference.

It is another object of the present invention to provide a recording circuit, as aforesaid, which is particularly suited for use with a video tape recorder, a video disc apparatus and the like.

It is a further object of this invention to provide a recording circuit in which a luminance signal of a color video signal is frequency modulated and mixed for recording with a low frequency converted carrier chrominance signal of the color video signal, and in which a beat interference between an odd-numbered side band component of the FM luminance signal and the low frequency converted carrier chrominance signal is avoided.

According to an aspect of the present invention, a recording circuit comprises:

a frequency modulator for frequency-modulating an input signal, for example, a luminance signal;

a phase inverter for phase-inverting a signal of a predetermined frequency, for example, the carrier frequency of a low frequency converted carrier chrominance signal, and which is included in an output signal of the frequency modulator and is to be cancelled; and a limiter for amplitude-limiting an output signal from the phase inverter, whereupon, the output signal from such limiter and another signal, such as, the low-frequency converted carrier chrominance signal, are mixed and then recorded on a recording medium.

The above, and other objects, features and advantages of the present invention, will become apparent in the following detailed description of a preferred embodiment which is to be read in conjunction with the accompanying drawings, and in which like reference numerals are used to identify the same or similar parts in the several views.

BRIEF DESCRIPTION OF THE DRAWINGS

FIG. 4 is a block diagram showing a recording circuit according to an embodiment of the present invention;

FIG. 5 is a block diagram of a phase inverter constituting a main component of the recording circuit of FIG. 4;

DETAILED DESCRIPTION OF A PREFERRED EMBODIMENT

Figure 3A:
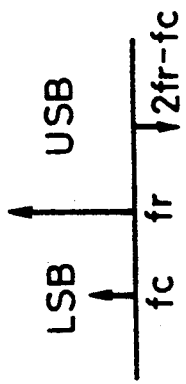
FIG. 2 and FIGS. 3A-3C are frequency spectrum diagrams to which reference is made in explaining a problem encountered in connection with the circuit shown in FIG. 1.
Figure 3B:
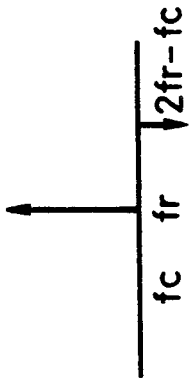
Figure 3C:
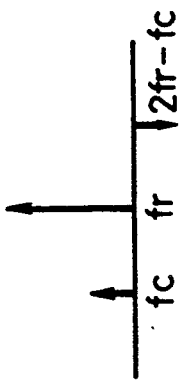
Figure 1:
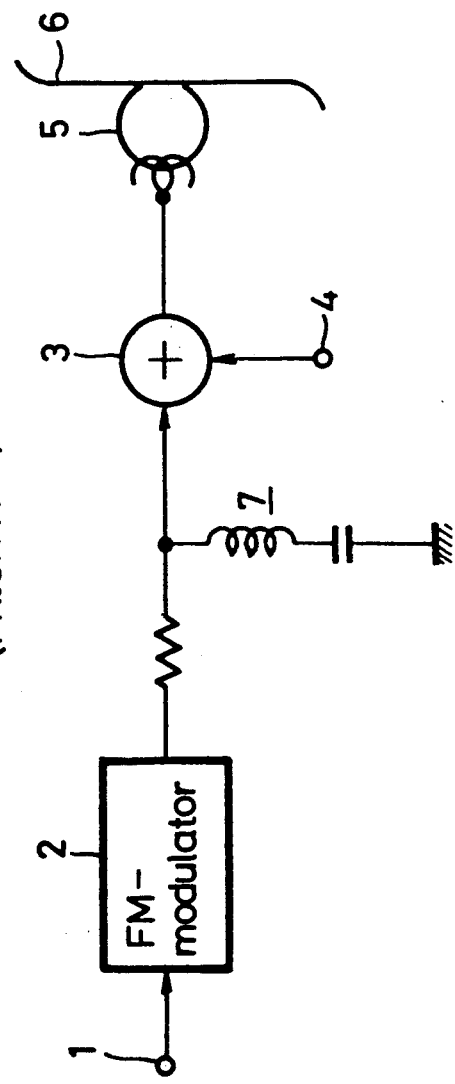
FIG. 1 is a block diagram showing an example of a trap circuit employed according to the prior art.
Figure 2:
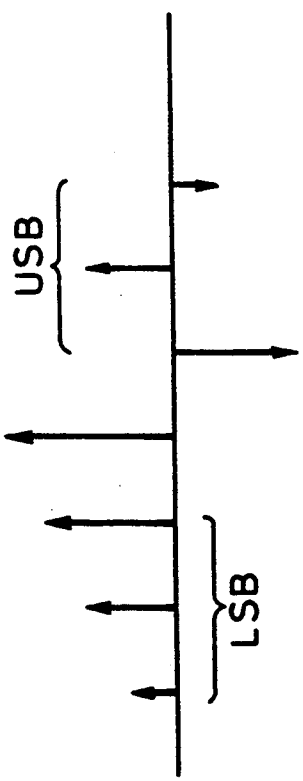

A recording circuit for a VTR or similar apparatus according to an embodiment of the present invention will now be described in detail with reference to FIG. 4 in which parts corresponding to those described with reference to FIG. 1 are identified by the same reference numerals and will not be further described in detail. In the embodiment shown in FIG. 4, a first limiter 10, a phase inverter 11 and a second limiter 12 are provided in sequence between the FM modulator 2 and the respective input of the adder 3.

The limiter 10 is provided to limit the amplitude component of the FM luminance signal and thereby obtain an FM signal having no envelope component. The limiter 10 may be removed if an FM signal with no envelope component is already obtained from the FM modulator 2. The phase inverter 11 is adapted to phase-invert a signal of a particular frequency, for example, only a signal having a frequency corresponding to the frequency of a signal supplied to the adder 3 from the terminal 4, and which is desirably a low frequency converted carrier chrominance signal or AFM signal. The phase inverter 11 has a constant gain and may be desirably formed as shown in FIG. 5, by way of example.

The phase inverter 11 of FIG. 5 is shown to generally comprise a bandpass filter 14, an amplifier 15 and an adder 16. The bandpass center frequency $f_0$ of the bandpass filter 14 is selected to be substantially equivalent to a frequency $f_1$ of the signal applied to the terminal 4. The signal including the frequency $f_0$ derived from the limiter 10 is supplied to one input of the adder 16, and is also supplied to the bandpass filter 14. The signal having the frequency $f_0$ passes through the bandpass filter 14, is amplified twice in amplitude and phase-inverted by the amplifier 15, and is then supplied to another input of the adder 16. Consequently, a signal having a frequency of $-f_0$ is supplied from the output of the adder 16. In other words, in the phase inverter 11 of FIG. 5, a signal having a frequency $f_0$ substantially equal to the frequency $f_1$ of the signal applied to the terminal 4 is phase-inverted and supplied from the output of the adder 16 for application to the limiter 12 (FIG. 4).

Figure 6:
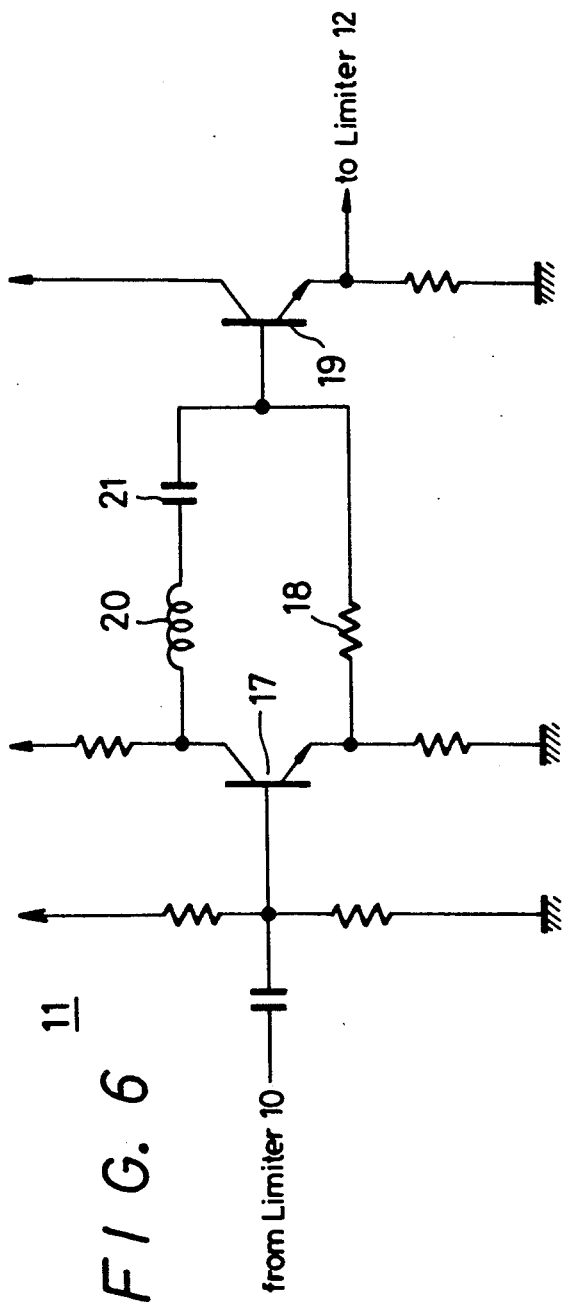
FIG. 6 is a schematic diagram showing a practical circuit for the phase inverter of FIG. 5.

In a practical circuit arrangement of the phase inverter 11, as shown in FIG. 6, the signal including the frequency $f_0$ from the limiter 10 (FIG. 4) is supplied to the base of a first transistor 17, and fed through the emitter of the transistor 17 and a resistor 18 to the base of a second transistor 19. This signal line corresponds to the signal path which extends directly from the limiter 10 to one input of the adder 16 in FIG. 5. The signal applied to the base of the transistor 17 is derived, at the collector of the transistor 17, an inverted signal. A particular frequency component of such derived signal is extracted by a bandpass filter formed of a coil 20 and a capacitor 21, respectively, and is fed to the base of the transistor 19. In other words, the latter signal line including the coil 20 and capacitor 21 corresponds to the path extending to the other input of the adder 16 from the limiter 10 through the bandpass filter 14 and the amplifier 15 in FIG. 5. The signals supplied through the resistor 18, and through the coil 20 and capacitor 21, respectively, to the base of the transistor 19 are added therein, and hence, a signal of $-f_0$ is developed at the output or emitter of the transistor 19.

Turning back to FIG. 4, it is to be noted that the limiter 12 is operated as a circuit for suppressing an AM (amplitude-modulated) component contained in the phase-inverted signal from the phase inverter 11.

Operation of the circuit of FIG. 4 will now be explained with reference to FIGS. 7A to 7C and FIGS. 8A and 8B.

Figure 7C:
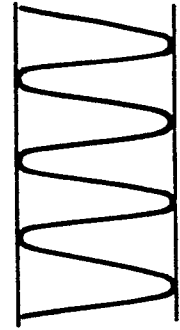
FIGS. 7A to 7C and FIGS. 8A and 8B are schematic diagrams to which reference will be made in explaining operation of the embodiment shown in FIG. 4.
Figure 7B:
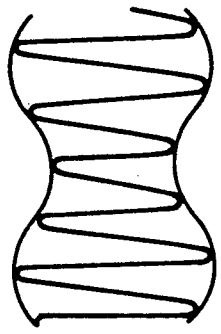
Figure 7A:
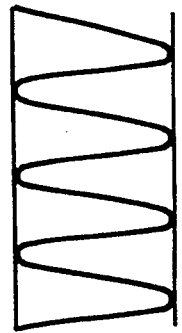
Figure 8A:
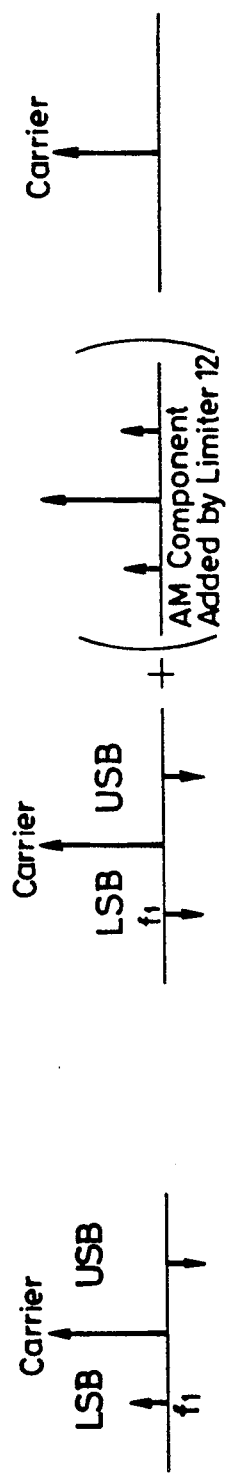
Figure 8B:
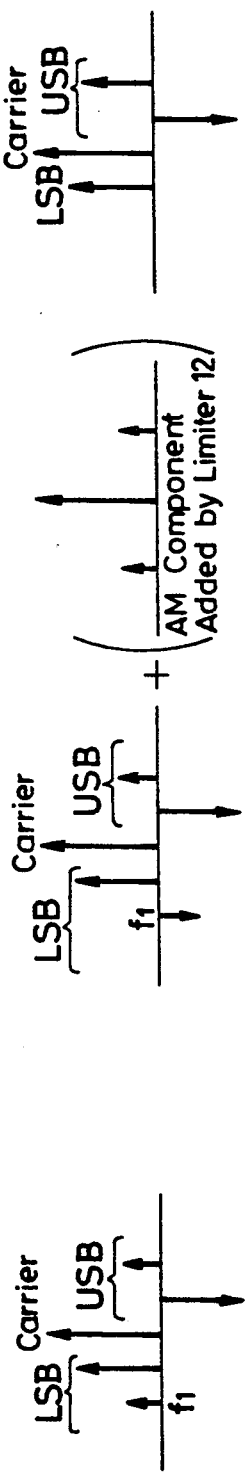

The input signal from the input terminal 1, for example, the luminance signal, is FM-modulated by the FM modulator 2 and the AM component thereof is suppressed by the limiter 10 which provides an output signal as shown in FIG. 7A. FIGS. 8A and 8B respectively illustrate examples of FM signals in which frequencies of the odd-numbered and even-numbered side band components become equivalent to the frequency $f_1$ of the signal applied to the terminal 4 in FIG. 4. More specifically, FIG. 8A shows odd-numbered side band components having the frequency $f_1$ which appear when the modulation degree is small, whereas FIG. 8B shows even-numbered side band components having the frequency $f_1$ which appear when the modulation degree is large.

When the signal shown in FIG. 7A is emitted from the output of the limiter 10, the odd-numbered side band components are as shown in the left-hand side portion of FIG. 8A, and the even-numbered side band components are as shown in the left-hand side portion of FIG. 8B. It will be understood from FIG. 8A that the odd-numbered side band components in the lower and upper side bands LSB and USB are in opposite phase relationship to each other, whereas, it will be understood from FIG. 8B, that the even-numbered side band components in the lower and upper side band have the same phase as the carrier.

When the signal from the limiter 10 is supplied to the phase inverter 11 in which the signal having the frequency $f_1$ is phase inverted, the result thereof is to provide the envelope of the signal $f_1$ with an AM component, as shown in FIG. 7B. From the central portions of FIGS. 8A and 8B, it will be seen that the signal of the frequency $f_1$ in the LSB is phase-inverted by the phase inverter 11. Thus, the AM component of the envelope of the signal having the frequency $f_1$ is caused by the phase inversion.

The signal having the frequency $f_1$ is merely phase-inverted by the phase inverter 11 and is then supplied to the limiter 12, in which the described AM component of the envelope is suppressed, so that the limiter 12 provides at its output a signal as shown in FIG. 7C. In other words, AM components which cancel the AM components of the output from the phase inverter 11, and which are shown within parentheses at the central portions of FIGS. 8A and 8B, are added in the limiter 12 to the output from the phase inverter 11. It is clear from the right-hand side portions of FIGS. 8A and 8B that the odd-numbered side band components are cancelled in both the USB and LSB (FIG. 8A) and that the even-numbered side band components are cancelled only in LSB (FIG. 8B).

The signal developed at the output side of the limiter 12 is supplied to the adder 3, in which it is added to the other signal applied from the terminal 4, and the resulting combined signal is recorded on the magnetic tape 6 by the magnetic head 5. The envelope of the signal from the limiter 12 contains no AM component so that, even when it is processed by a recording system having limiter characteristics, the restoration of the side band components at the frequency $f_1$ can be prevented.

By way of summary, it is to be noted that, in accordance with the present invention, the phase inverter 11 acts on the output of the FM modulator 2 to phase-invert only the signal having the particular frequency $f_1$ which it is desired to cancel before the FM signal is mixed with another signal, such as, the low-frequency converted chrominance signal, whereupon, the output of the phase inverter is amplitude-limited. Thus, when the FM luminance signal is added or combined with the low-frequency converted carrier chrominance signal and is recorded on the recording medium, regardless of the limiter characteristic of the recording system, interference of the FM luminance signal with the low frequency converted carrier chrominance signal can be prevented for avoiding a beat interference or the like.

Although a preferred embodiment of the invention has been described in detail with reference to the accompanying drawings, it is to be understood that the present invention is not limited to that precise embodiment, and that many changes and modifications could be effected therein by one skilled in the art without departing from the spirit and scope of the invention as defined in the appended claims.

What is claimed is:

1. A recording circuit for recording a color video signal including a luminance signal and a low frequency converted carrier chrominance signal, comprising:

frequency modulating means for frequency-modulating said luminance signal to produce a frequency-modulated luminance signal;

phase inverting means for phase-inverting a lower side-band component of said frequency modulated luminance signal having a predetermined frequency substantially equal to the carrier frequency of the low frequency converted carrier chrominance signal to provide a frequency-modulated luminance signal having the phase-inverted lower-sideband component;

limiting means coupled to the phase inverting means for amplitude-limiting said frequency-modulated luminance signal having said phase-inverted lower side-band component, said limiting means being operative to produce a further component having substantially the same frequency as said phase-inverted lower side-band component and a phase opposite thereto such that said lower side-band component is substantially cancelled by said further component;

adding means for mixing the amplitude-limited signal from said limiting means with said low-frequency converted carrier chrominance signal to produce a recording signal; and means for recording said recording signal on a recording medium.

2. A recording circuit according to claim 1; in which said recording medium is a magnetic tape.

3. A recording circuit according to claim 1; in which said phase inverting means includes a bandpass filter, an amplifier and an adder for adding said frequency-modulated luminance signal from the frequency modulating means, after being passed through said bandpass filter and amplified by said amplifier, to said frequency-modulated output in an opposite phase, said bandpass filter being operative to pass signals within a pass band including the frequency of said lower side-band component.

4. A recording circuit according to claim 3, in which said phase inverting means includes first and second transistor amplifying means each having base, emitter and collector electrodes, means for applying said frequency-modulated luminance signal from the frequency modulating means to said base electrode of the first transistor amplifying means, means connecting said emitter electrode of said first transistor amplifying means to said base electrode of said second transistor amplifying means, a coil and a capacitor connected between said collector electrode of said first transistor amplifying means and said base electrode of said second transistor amplifying means and constituting said bandpass filter, and means for deriving said frequency-modulated luminance signal having said phase-inverted lower side-band component from said emitter electrode of said second transistor amplifying means.

5. An apparatus for recording a color video signal having a frequency modulated luminance signal and a low frequency converted carrier chrominance signal, the frequency modulated luminance signal including a side band component having a frequency which is sufficiently close to a carrier frequency of said low frequency converted chrominance signal to produce beat interference therewith, said apparatus comprising:

a circuit for preventing a beat interference between said carrier frequency of the low frequency converted carrier chrominance signal and said side band component by substantially canceling said side band component, including:

means for receiving the frequency modulated luminance signal;

phase inverting means for phase-inverting said side band component of the received frequency modulated luminance signal to provide a frequency modulated luminance signal having the phase-inverted side-band component; and limiting means coupled to the phase inverting means for amplitude-limiting the frequency modulated luminance signal having said phase-inverted side band component, said limiting means being operative to produce a further side band component having substantially the same frequency as said phase-inverted side band component and a phase opposite thereto, such that said further side band component substantially cancels said phase-inverted side band component to produce a side band suppressed frequency modulated luminance signal;

said apparatus further comprising:

adding means for adding said side band suppressed frequency modulated luminance signal and said low frequency converted carrier chrominance signal to produce a recording signal; and means for recording the recording signal on a record medium.

6. An apparatus for recording according to claim 5; in which said record medium is a magnetic tape.

7. An apparatus for recording according to claim 5; in which said phase inverting means includes: bandpass filter means supplied with the received frequency modulated luminance signal for passing components thereof within a pass band including the frequency of said side band component to produce a filtered signal, an amplifier means for amplifying and phase inverting said filtered signal and adder means for adding the amplified and phase inverted filtered signal to the received frequency modulated luminance signal.

8. An apparatus for recording according to claim 5; in which said phase inverting means includes first and second transistors each having base, emitter and collector electrodes, means for applying the frequency modulated luminance signal to said base electrode of the first transistor, means connecting said emitter electrode of said first transistor to said base electrode of said second transistor, a coil and a capacitor connected between said collector electrode of said first transistor and said base electrode of said second transistor for forming a bandpass filter for said frequency modulated luminance signal, and means for deriving said frequency modulated luminance signal having the phase-inverted side band component from said emitter electrode of said second transistor.

* * * * *